United States Patent
Mori et al.

(10) Patent No.: US 9,977,126 B2
(45) Date of Patent: May 22, 2018

(54) RADAR APPARATUS

(71) Applicant: FUJITSU TEN LIMITED, Kobe-shi, Hyogo (JP)

(72) Inventors: Shota Mori, Kobe (JP); Hiroyuki Ishimori, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 390 days.

(21) Appl. No.: 14/692,144

(22) Filed: Apr. 21, 2015

(65) Prior Publication Data

US 2015/0309172 A1   Oct. 29, 2015

(30) Foreign Application Priority Data

Apr. 25, 2014   (JP) .................. 2014-091103

(51) Int. Cl.
| | |
|---|---|
| *G01S 13/93* | (2006.01) |
| *G01S 13/34* | (2006.01) |
| *G01S 7/41* | (2006.01) |
| *B60W 30/09* | (2012.01) |
| *G01S 13/00* | (2006.01) |

(52) U.S. Cl.
CPC .......... *G01S 13/931* (2013.01); *B60W 30/09* (2013.01); *G01S 7/41* (2013.01); *G01S 13/345* (2013.01); *G01S 7/415* (2013.01); *G01S 2013/935* (2013.01); *G01S 2013/9321* (2013.01); *G01S 2013/9346* (2013.01); *G01S 2013/9353* (2013.01); *G01S 2013/9375* (2013.01)

(58) Field of Classification Search
CPC ........ G01S 13/931; G01S 7/41; G01S 13/345; G01S 2013/9375; G01S 2013/9353; G01S 7/415; G01S 2013/935; G01S 2013/9346; G01S 2013/9321; B60W 30/09
See application file for complete search history.

(56) References Cited

U.S. PATENT DOCUMENTS

| | | | | |
|---|---|---|---|---|
| 6,438,491 B1 * | 8/2002 | Farmer | .................... | G01S 7/41 |
| 6,765,523 B2 * | 7/2004 | Ono | .................... | G01S 13/931 |
| 6,812,882 B2 * | 11/2004 | Ono | .................... | G01S 13/931 |
| 2003/0112173 A1 * | 6/2003 | Seki et al. | ............ | G01S 13/931 |
| 2003/0122703 A1 * | 7/2003 | Kishida et al. | ....... | G01S 13/931 |

FOREIGN PATENT DOCUMENTS

| | | |
|---|---|---|
| JP | 2001-324566 A | 11/2001 |
| JP | 2009-063440 A | 3/2009 |

\* cited by examiner

*Primary Examiner* — Bernarr E Gregory
(74) *Attorney, Agent, or Firm* — Oliff PLC

(57) ABSTRACT

A radar apparatus is configured to derive information of a target in a vicinity of a host vehicle. The radar apparatus comprising a signal processor configured to: determine whether or not the target is a standstill object having an absolute speed less than a predetermined speed, determine whether or not the target determined as the standstill object is an upper object overhead of the host vehicle and with which the host vehicle cannot collide, and determine whether or not an environment for deriving target information is an adverse environment based on a frequency of determining existence of the upper object that also is the standstill object.

13 Claims, 11 Drawing Sheets

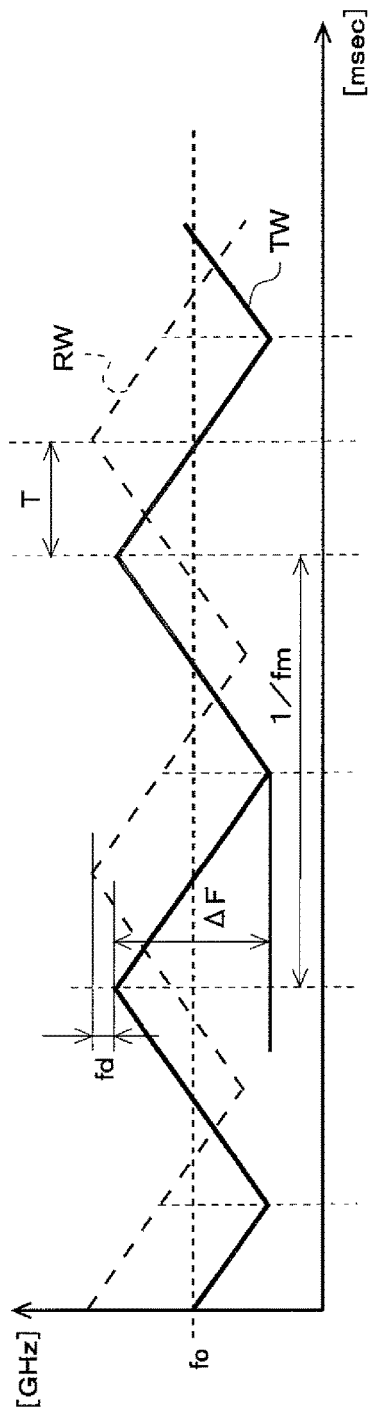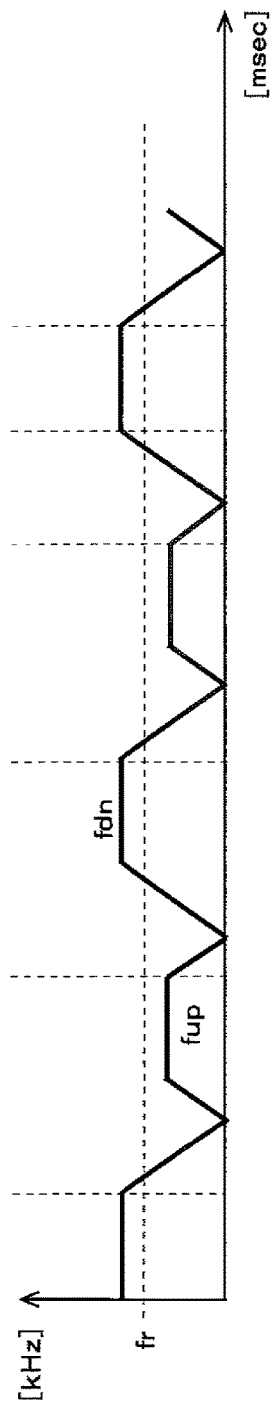
FIG.3A
FIG.3B

RADAR APPARATUS

BACKGROUND OF THE INVENTION

Field of the Invention

This invention relates to a technology for acquiring information relating to a target.

Description of the Background Art

In the related art, in a vehicle control system configured to follow up a preceding other vehicles and a vehicle control system configured to alleviate a collision with an obstacle, a radar apparatus configured to acquire information relating to a target in the periphery of a vehicle is used. The radar apparatus configured as described above transmits a transmitting wave, receives a reflected wave reflected from a target such as another vehicle, and acquires information such as a distance and a relative speed relating to the target on the basis of a received signal.

The radar apparatus transmits a transmitting wave, receives a reflected wave reflected from the target such as another vehicle, applies Fast Fourier Transform (FFT) on a beat signal on the basis of the received signal, and then extracts the beat signal exceeding a predetermined signal level as a peak signal. Subsequently, the radar apparatus acquires information such as the distance and the relative speed relating to the target on the basis of pair data obtained by pairing peak signals in respective periods of an up period and a down period in which a transmitting signal is modulated in frequency.

The radar apparatus then outputs the information such as the distance and the relative speed relating to the acquired target to a vehicle control apparatus, and the vehicle control apparatus performs vehicle control required based on the information relating to the target thereof.

However, when the vehicle is traveling in an environment in which the structure such as a truss bridge is present above, for example, a number of reflected waves are received from an upper object, so that erroneous pairing (erroneous pairing) may result. Consequently, correct information relating to the target cannot be acquired, and hence a detection performance is lowered, whereby erroneous vehicle control may occur.

SUMMARY OF THE INVENTION

According to an aspect of the invention, a radar apparatus is configured to derive information of a target in a vicinity of a host vehicle. The radar apparatus comprising a signal processor configured to: determine whether or not the target is a standstill object having an absolute speed less than a predetermined speed, determine whether or not the target determined as the standstill object is an upper object overhead of the host vehicle and with which the host vehicle cannot collide, and determine whether or not an environment for deriving target information is an adverse environment based on a frequency of determining existence of the upper object that also is the standstill object.

Since whether or not the environment for deriving the target information is an adverse environment is determined based on the frequency of derivation of the upper object, even in the case where the vehicle travels in an environment in which the structure such as a truss bridge is present above, the presence can be figured out and hence the erroneous vehicle control may be prevented from being performed.

According to another aspect of the invention, in a case where a particular object is determined to be (1) the standstill object closest to the apparatus and (2) the upper object, the signal processor determines the particular object to be suitable for use in determining whether or not a deriving environment of the target information is the adverse environment.

A standstill object farther from the standstill object closest to the apparatus is unstable in reception of a reflected wave, and hence a standstill object which is not the upper object, may be determined erroneously as the upper object. Accordingly, by using a standstill object closest to the apparatus as the upper object for determining whether or not the environment for deriving the target information is an adverse environment, erroneous determination may be prevented.

Therefore, it is an object of the invention to provide a technology which allows figuring out that the vehicle is traveling in an adverse environment which may lower the detection performance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a drawing illustrating a relationship between a transmitting wave and a reflected wave;

FIG. 3B is a drawing illustrating a beat signal;

DESCRIPTION OF THE EMBODIMENTS

Figure 1:
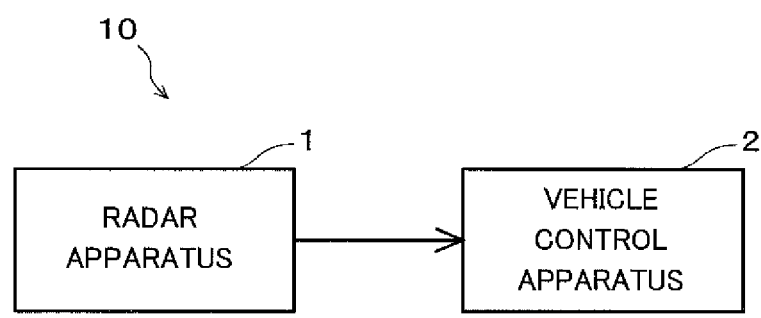
FIG. 1 is a block diagram of a vehicle control system.

Referring now to the drawings, embodiments of the invention will be described below.

1. System Configuration

FIG. 1 is a drawing illustrating a configuration of a vehicle control system 10 of an embodiment. The vehicle control system 10 is mounted, for example, on a vehicle such as an automotive vehicle. The vehicle on which the vehicle control system 10 is mounted is referred to as "host vehicle" (hereinafter referred to simply as "vehicle".) As illustrated in FIG. 1, the vehicle control system 10 includes a radar apparatus 1 and a vehicle control apparatus 2.

The radar apparatus 1 acquires information relating to targets present in the periphery of the vehicle (hereinafter, referred to as "target information".) The radar apparatus 1 of this embodiment acquires the target information of another vehicle in front of the vehicle by using an FMCW (Frequency Modulated Continuous Wave), which is a continuous wave modulated in frequency thereof. The target information includes for example, a distance of the target with respect to the vehicle [m](hereinafter, referred to as a "fore-and-aft distance"), a relative speed [km/h] of the target with respect to the vehicle, and a distance [m] of a target in a lateral direction of the vehicle (hereinafter, referred to as a "lateral distance"), and the radar apparatus 1 outputs the acquired target information to the vehicle control apparatus 2.

The vehicle control apparatus 2 is connected to a brake and a throttle of the vehicle, and controls behaviors of the vehicle on the basis of the target information output from the radar apparatus 1. For example, the vehicle control apparatus 2 performs control of following up the other vehicle while maintaining a distance from another vehicle traveling in front of the vehicle. Accordingly, the vehicle control system 10 of the embodiment functions as an ACC (Adaptive Cruise Control) system. The vehicle control apparatus 2 performs control to protect an occupant of the vehicle in the case where the vehicle and a preceding vehicle have a probability of colliding each other. Accordingly, the vehicle control system 10 of the embodiment functions as a PCS (Pre-Crash Safety System).

2. Configuration of Radar Apparatus

Figure 2:
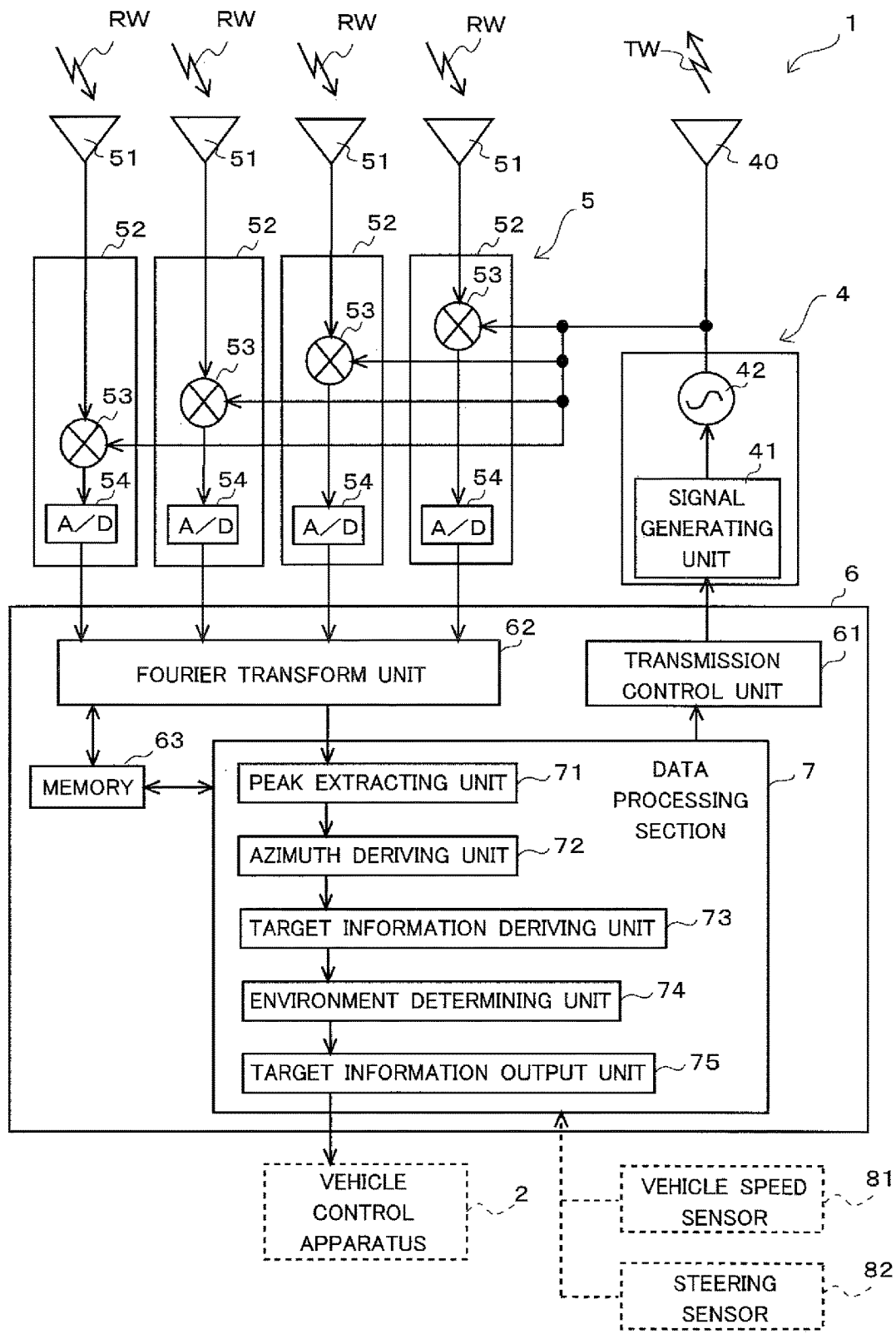
FIG. 2 is a block diagram illustrating a radar apparatus.

FIG. 2 is a drawing illustrating a configuration of the radar apparatus 1. The radar apparatus 1 is also provided mainly with a transmitting unit 4, a receiving unit 5, and a signal processing apparatus 6.

The transmitting unit 4 includes a transmitting antenna 40, a signal generating unit 41 and an oscillator 42. The signal generating unit 41 generates a modulation signal in which a voltage varies in a triangle wave shape, and supplies the modulation signal to the oscillator 42. The oscillator 42 modulates the frequency of a signal of the continuous wave on the basis of the modulation signal generated by the signal generating unit 41, thereby generating a transmitting signal in which the frequency varies in accordance with elapse of time, and outputting the transmitting signal to the transmitting antenna 40.

The transmitting antenna 40 outputs a transmitting wave TW to the outside of the vehicle on the basis of the transmitting signal from the oscillator 42. The transmitting wave TW output from the transmitting antenna 40 becomes an FMCW in which the frequency goes up and down at a predetermined cycle. The transmitting wave TW transmitted forward of the vehicle from the transmitting antenna 40 is reflected by the target such as another vehicle, and becomes a reflected wave RW.

The receiving unit 5 includes a plurality of receiving antennas 51 that forms an array antenna, and a plurality of individual receiving units 52 connected to the plurality of receiving antennas 51. In this embodiment, the receiving unit 5 includes, for example, four of the receiving antennas 51 and four of the individual receiving units 52. The four individual receiving units 52 correspond to the four receiving antennas 51, respectively. Each of the receiving antennas 51 receives the reflected wave RW from the target, and processes the received signal obtained by the receiving antennas 51 corresponding to the each individual receiving units 52.

Each of the individual receiving units 52 includes a mixer 53 and an A/D converter 54. The received signal obtained from the reflected wave RW received by the receiving antenna 51 is amplified by a low noise amplifier (illustration is omitted) and is transmitted to the mixer 53. The transmitting signal from the oscillator 42 of the transmitting unit 4 is input to the mixer 53, and in the mixer 53, the transmitting signal and the received signal are mixed. Accordingly, a beat signal which indicates a beat frequency, which is a difference between the frequency of the transmitting signal and the frequency of the received signal, is generated. The beat signal generated by the mixer 53 is output to the signal processing apparatus 6 after having converted into a digital signal by the A/D converter 54.

The signal processing apparatus 6 is provided with a microcomputer including a CPU and a memory 63. The signal processing apparatus 6 memorizes various piece of data to be computed into the memory 63, which is a memory apparatus. The memory 63 is, for example, a RAM. The signal processing apparatus 6 includes a transmission control unit 61, a Fourier transform unit 62, and a data processing section 7 as functions to be implemented by software in the microcomputer. The transmission control unit 61 controls the signal generating unit 41 of the transmitting unit 4.

The Fourier transform unit 62 executes a fast Fourier transform (FFT) with respect to the beat signal output from the plurality of individual receiving units 52, respectively. Accordingly, the Fourier transform unit 62 transforms the beat signal relating to the respective receiving signals of the plurality of receiving antennas 51 into a frequency spectrum, which is data of a frequency region. The frequency spectrum obtained by the Fourier transform unit 62 is input to the data processing section 7.

The data processing section 7 derives the target information (fore-and-aft distance, relative speed, and lateral distance, etc.) on the basis of the frequency spectrum of the plurality of receiving antennas 51, respectively. The data processing section 7 outputs the derived target information to the vehicle control apparatus 2. Information from various sensors such as a vehicle speed sensor 81 and a steering sensor 82 provided on the vehicle is input to the data processing section 7. Examples of the information from the various sensors include speed information of the vehicle input from the vehicle speed sensor 81 and steering information of the vehicle input from the steering sensor 82, for example.

In FIG. 2, a peak extracting unit 71, an azimuth deriving unit 72, a target information deriving unit 73, an environment determining unit 74, and a target information output unit 75 are illustrated as main functional portions of the data processing section 7. Detailed description about the processes of these functional portions will be given later.

3. Acquirement of Target Information

Subsequently, a method (principle) that the radar apparatus 1 acquires target information will be described. FIG. 3A is a drawing illustrating a relationship between the transmitting wave TW and the reflected wave RW, and FIG. 3B is a drawing illustrating a beat signal. In order to simplify the description, the reflected wave RW illustrated in FIG. 3A is a reflected wave only from one ideal target. In FIG. 3A, the transmitting wave TW is illustrated by a solid line, and the reflected wave RW is illustrated by a broken line. In FIGS. 3A and 3B, a lateral axis represents time, and a vertical axis represents a frequency.

As illustrated in FIG. 3A, the transmitting wave TW is a continuous wave whereof the frequency goes up and down at a predetermined cycle with respect to a predetermined frequency. The frequency of the transmitting wave TW changes linearly with respect to time. In the following description, a period in which the frequency of the transmitting wave TW increases is referred to as an "UP period", and a period in which the frequency of the transmitting wave TW decreases is referred to as a "DOWN period". A center frequency of the transmitting wave TW is defined as fo, a displacement width of the frequency of the transmitting wave TW is defined to be ΔF, and a cycle that the frequency of the transmitting wave TW goes up and down is represented by fm.

Since the reflected wave RW is the transmitting wave TW reflected from the target, the reflected wave RW is a continuous wave whereof the frequency goes up and down at a predetermined cycle with respect to the predetermined frequency in the same manner as the transmitting wave TW. However, the reflected wave RW has a time lag with respect to the transmitting wave TW by time T. The delayed time T corresponds to a distance (fore-and-aft distance) R of the target with respect to the vehicle, and is expressed by the following Expression (1) where c is a light speed (the speed of the electric wave).

$$T = \frac{2 \times R}{c} \qquad (1)$$

A frequency shift of a frequency fd is generated in the reflected wave RW with respect to the transmitting wave TW due to a Doppler effect in accordance with a relative speed V of the target with respect to the vehicle.

In this manner, the frequency shift in accordance with the relative speed is generated in the reflected wave RW with a time lag with respect to the transmitting wave TW in accordance with the fore-and-aft distance. Therefore, as illustrated in FIG. 3B, the values of a frequency of the beat signal generated by the mixer 53 (the frequency of a difference between the frequency of the transmitting wave TW and the frequency of the reflected wave RW) are different in the UP period and the DOWN period. Hereinafter, the beat frequency in the UP period is defined as fup, and the beat frequency in the DOWN period is defined as fdn.

Here, if a beat frequency in the case where the relative speed of the target is "0" (if there is no frequency shift due to a Doppler effect) is fr, the frequency fr is expressed by the following Expression (2).

$$fr = \frac{fup + fdn}{2} \qquad (2)$$

The frequency fr takes a value in accordance with the delay time T described above. Therefore, a fore-and-aft distance R of the target can be obtained with the following Expression (3) by using the frequency fr.

$$R = \frac{c}{4 \times \Delta F \times fm} \times fr \qquad (3)$$

The frequency fd shifted by Doppler Effect is expressed by the following Expression (4).

$$fd = \frac{fup - fdn}{2} \qquad (4)$$

The relative speed V of the target can be obtained by the following Expression (5) by using the frequency fd.

$$V = \frac{c}{2 \times fo} \times fd \qquad (5)$$

In the description given above, the fore-and-aft distance and the relative speed of one ideal target have been obtained. However, actually, the radar apparatus 1 receives the reflected waves RW from a plurality of targets simultaneously. Therefore, the frequency spectrum obtained by applying the FFT process on the beat signal that the Fourier transform unit 62 obtains from the received signal includes information corresponding respectively to the plurality of targets. In the following description, processes of peak extraction, azimuth arithmetic operation, and pairing performed on the basis of the frequency spectrum in the process of acquiring the target information will be described.

Figure 4A:
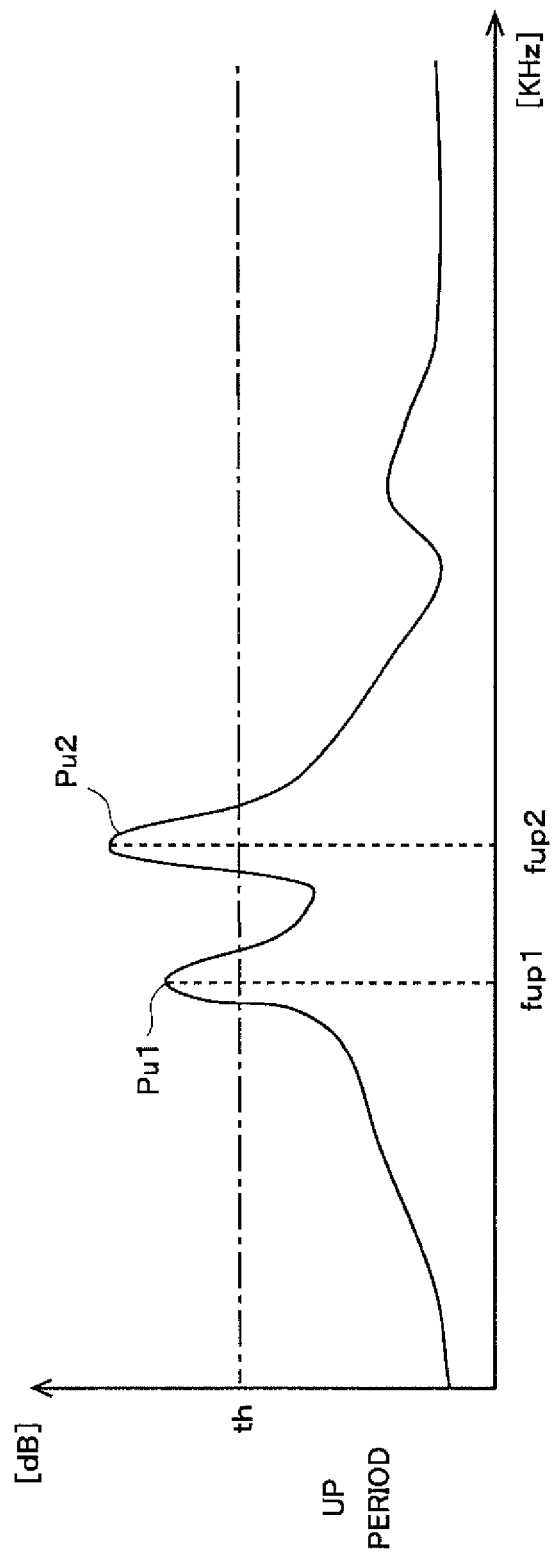
FIG. 4A is a drawing illustrating an example of a frequency spectrum during an UP period.
Figure 4B:
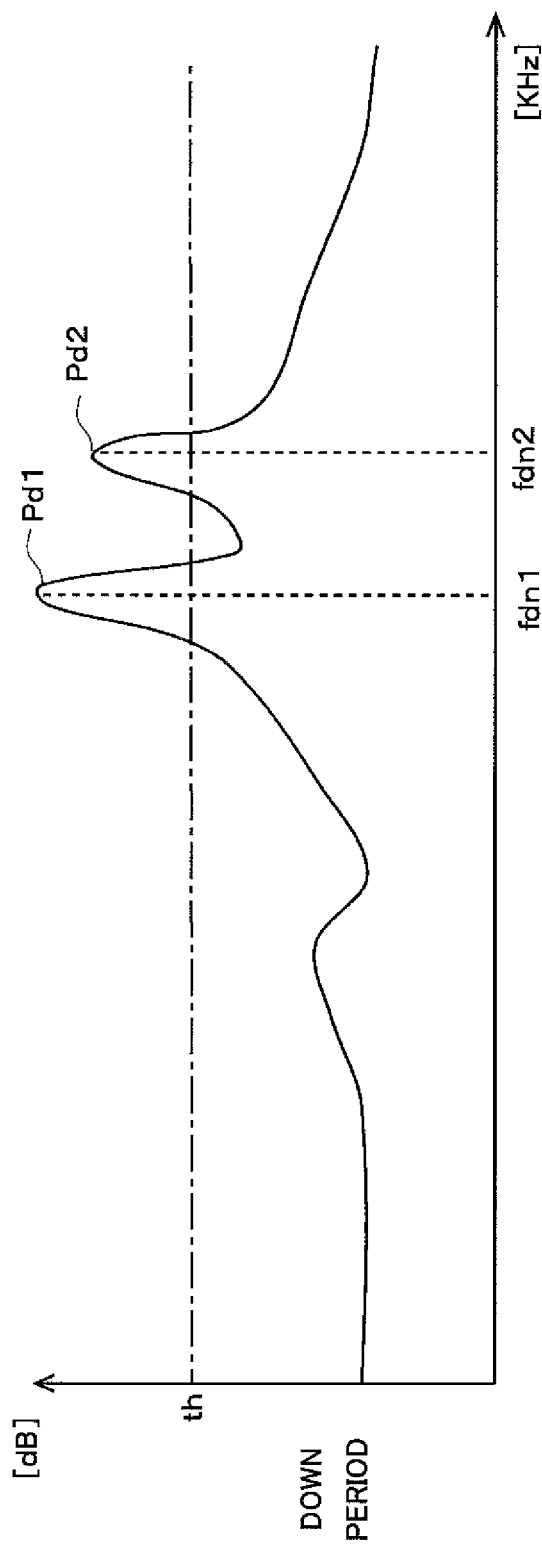
FIG. 4B is a drawing illustrating an example of a frequency spectrum during a DOWN period.

3-1. Peak Extraction FIG. 4A is a drawing illustrating an example of a frequency spectrum in the UP period. FIG. 4B is a drawing illustrating an example of a frequency spectrum in the DOWN period. In FIG. 4A and FIG. 4B, vertical axis represents the frequency, and lateral axis represents the signal power.

In the frequency spectrum in the UP period illustrated in FIG. 4A, peaks Pu1 and Pu2 appear at positions of two frequencies fup1 and fup2, respectively. In the frequency spectrum in the DOWN period illustrated in FIG. 4B, peaks Pd1 and Pd2 appear at positions of two frequencies fdn1 and fdn2, respectively. If the relative speed is not considered, the frequencies at the positions where the peaks appear in the frequency spectrum in this manner correspond to the fore-and-aft distance of the target.

The peak extracting unit 71 (see FIG. 2) of the data processing section 7 extracts frequencies at which peaks (peaks Pu1, Pu2, Pd1, and Pd2 in FIG. 4A and FIG. 4B) having powers exceeding a predetermined threshold value th for both frequency spectra of the UP period and the DOWN period. Hereinafter, the frequency extracted in this manner is referred to as "peak frequency".

3-2. Azimuth Arithmetic Operation

The frequency spectra in both of the UP period and the DOWN period as illustrated in FIG. 4A and FIG. 4B are obtained from a received signal of a single receiving antenna 51. Therefore, the Fourier transform unit 62 derives both of the frequency spectra of the UP period and the DOWN period as in FIG. 4A and FIG. 4B from the respective received signals of the four receiving antennas 51.

The four receiving antennas 51 receive the reflected waves RW from the same target, and hence the extracted peak frequencies become the same among the frequency spectra of the four receiving antennas 51 each other. However, since the positions of the four receiving antennas 51 are different from each other, phases of the reflected waves RW are different from one receiving antenna 51 to another. Therefore, phase information of the received signals, which have the same peak frequency differs from one receiving antenna 51 to another.

In the case where there are a plurality of targets in the substantially same fore-and-aft distances, the signal of one peak frequency in the frequency spectrum (hereinafter, referred to as "peak signal") includes information on the plurality of targets. Therefore, the azimuth deriving unit 72 of the data processing section 7 (see FIG. 2) separates information on the plurality of targets relating to the corresponding signal from the one peak signal, and estimates angles of the plurality of targets respectively by the azimuth arithmetic processing using an ESPRIT (Estimation of Signal Parameters via Rotational Invariance Techniques).

In other words, in the case where the targets are present at different angles in the substantially same fore-and-aft distance, the azimuth deriving unit 72 derives information on a plurality of "angles" from the one peak signal. The azimuth deriving unit 72 separates and derives "angular powers", which are powers of respective signals at a plurality of angles from the one peak signal.

A possible number of separation by ESPRIT used in the azimuth deriving unit 72 is for example, "3", and the azimuth deriving unit 72 derives three angles at the maximum from the one peak signal. The azimuth deriving unit 72 executes such an angle derivation for all of the peak frequencies in the both frequency spectra in the UP period and the DOWN period. In the following description, the number of the target present in the substantially same fore-and-aft distance is assumed to "1" for the simplicity of description. In other words, the number of angles derived for each of the peaks Pu1, Pu2, Pd1, and Pd2 is one, and hence the number of the angular power corresponding to each of the angles is also one.

3-3. Pairing

In this manner, the peak signals corresponding respectively to the plurality of targets are derived by the process of the data processing section 7, and angles and angular powers with respect to the peak signals are derived by the process of the azimuth deriving unit 72. Consequently, the peak signal in each of the periods of the UP period and DOWN period includes parameter values of a "peak frequency", an "angle", an "angular power".

The target information deriving unit 73 of the data processing section 7 (see FIG. 2) derives pair data by combining a peak signal in the UP period and a peak signal in the DOWN period in the pairing process. Specifically, the target information deriving unit 73 derives a "Mahalonobis' generalized distance", which is a reliability index of the combination of the peak signals by using a parameter value of the peak signal in the UP period (the angle and the angular power), and a parameter value of the peak signal in the DOWN period (the angle and the angular power). The target information deriving unit 73 performs a pairing process on the basis of the Mahalonobis' generalized distance to derive the pair data.

The target information deriving unit 73 may obtain the fore-and-aft distance R of the target by using Expression 2 and Expression 3 given above, and may obtain the relative speed V of the target by using Expression 4 and Expression 5 given above. The target information deriving unit 73 obtains an angle θ of the target by the following Expression (6), where the angle of the UP period is θup and the angle of the DOWN period is θdn.

$$\theta = \frac{\theta up + \theta dn}{2} \quad (6)$$

The target information deriving unit 73 is capable of obtaining the lateral distance of the target by arithmetic operation using a trigonometric function on the basis of this angle θ and the fore-and-aft distance R of the target.

4. Process Flow Chart

Subsequently, a general flow of a target information acquiring process that the data processing section 7 executes will be described. The target information acquiring process is a process including the peak extraction, the azimuth arithmetic operation, and the pairing described above, and is a process performed by the data processing section 7 to derive target information and output the target information to the vehicle control apparatus 2. In this embodiment, an environment determining process is performed, and the result of determination is output to the vehicle control apparatus 2. The environment determining process is a process for determining whether or not an environment in which the vehicle travels is a so-called adverse environment, in which erroneous pairing may easily occur.

Figure 5:
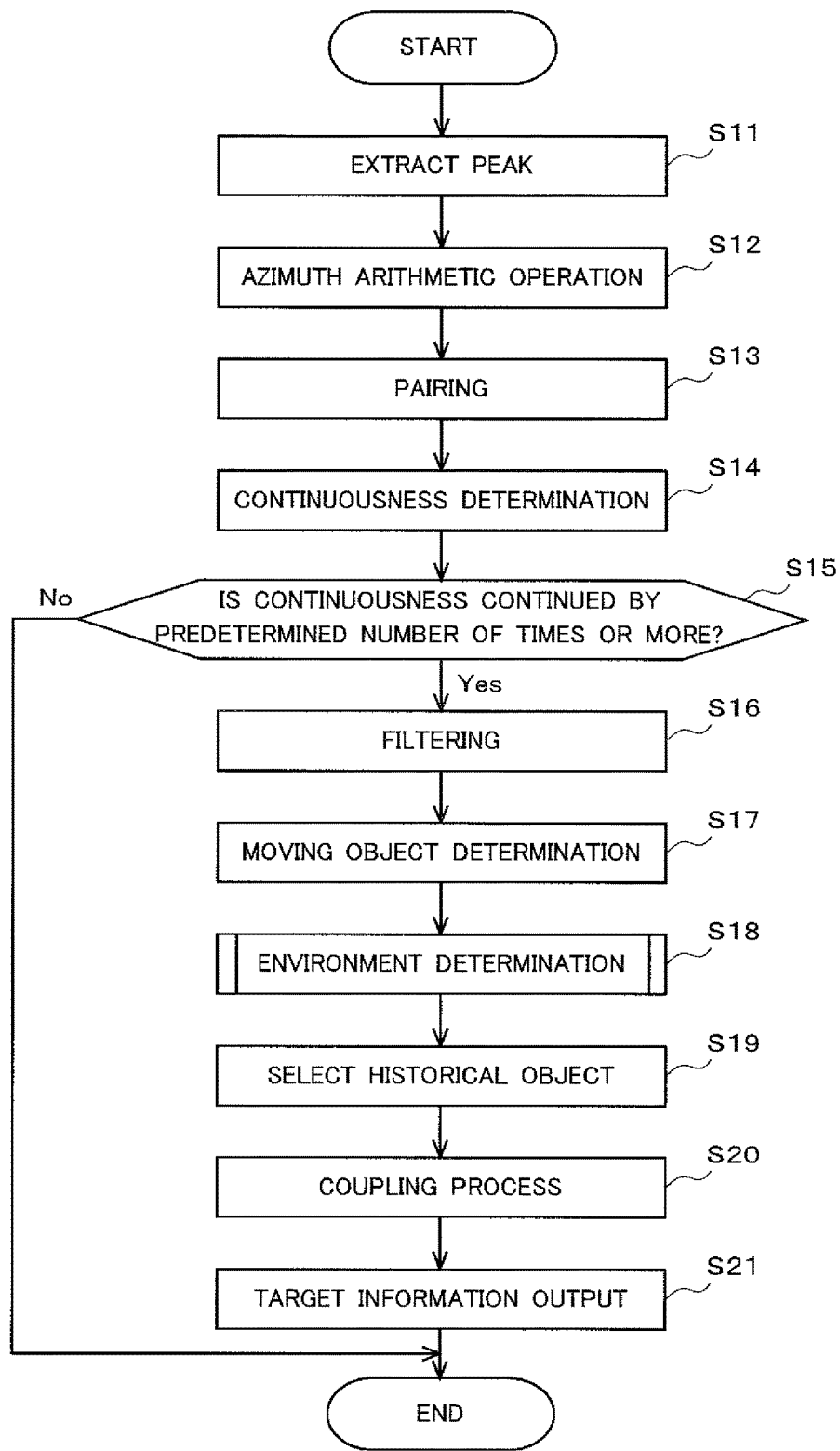
FIG. 5 is a drawing illustrating a flow of a target information acquiring process.

FIG. 5 is a drawing illustrating a flow of a target information acquiring process. The data processing section 7 repeats the target information acquiring process continuously at a predetermined temporal interval (for example, a cycle of 1/20 second). At the starting point of the target information acquiring process, the frequency spectra in both the UP period and the DOWN period are input to the data processing section 7 from the Fourier transform unit 62 for all of the four receiving antennas 51.

The peak extracting unit 71 extracts a peak frequency on the basis of the frequency spectrum (Step S11). The peak extracting unit 71 extracts a frequency, as the peak frequency, at which a peak having a signal level exceeding a predetermined threshold value th appears from among the frequency spectra respectively in the UP period and the DOWN period. In the examples of FIG. 4A and FIG. 4B, the peak extracting unit 71 extracts frequencies fup1, fup2, fdn1, and fdn2 of the peak signals Pu1, Pu2, Pd1, and Pd2 respectively as the peak frequencies.

Subsequently, the azimuth deriving unit 72 executes the azimuth arithmetic operation process on the basis of the peak frequency extracted by the peak extracting unit 71 (Step S12). Specifically, the azimuth deriving unit 72 estimates an angle of the target by the azimuth arithmetic operation process using the ESPRIT. Accordingly, the azimuth deriving unit 72 derives the angle and the angular power of the plurality of targets, respectively.

With such a process, the data processing section 7 derives peak signals corresponding respectively to the plurality of targets present in front of the vehicle. In other words, the data processing section 7 derives the peak signals having the parameter values including the peak frequency, the angle, and the angular power in both of the UP period and the DOWN period.

Subsequently, the target information deriving unit 73 performs pairing of the peak signal in the UP period and the peak signal in the DOWN period (Step S13). Specifically, the target information deriving unit 73 derives the Mahalonobis' generalized distance on the basis of all of the combinations of the peak signals in the UP period and the peak signals in the DOWN period, and derives a combination which provides a smallest value of the Mahalonobis' generalized distance as the pair data.

The target information deriving unit 73 derives the fore-and-aft distance, the relative speed, and the lateral distance of the target as target information on respective pieces of derived pair data.

Subsequently, the target information deriving unit 73 determines the presence or absence of a temporal continuity between the pair data derived by the target information acquiring process of this time (hereinafter, referred to as "the process of this time") and the pair data derived by the target information acquiring process in the past (hereinafter, referred to as "the process in the past" (Step S14).

The target information deriving unit 73 estimates the target information (the fore-and-aft distance, the relative speed, and the lateral distance) in the process of this time of the target relating to pair data, from the pair data in the process in the past. Accordingly, the target information deriving unit 73 derives pair data, which is not real data, having estimated target information (hereinafter, referred to as "estimated pair data").

The target information deriving unit 73 then selects one approximate pair data having values relating to the estimated pair data and the target information from a plurality of pieces of pair data derived in the process of this time. The target information deriving unit 73 determines the selected pair data to be pair data having a continuity with the pair data processed in the past, that is, to be pair data indicating the same target as the pair data processed in the past.

The target information deriving unit 73 determines the continuity for all of the pair data in the process in the past stored in the memory 63. In this determination, if pair data of the process of this time close to a parameter value of the estimated pair data does not exist, the estimated pair data is used as the pair data in the process of this time having the continuity with the pair data in the process in the past. In this manner, a process to cause the target information to be derived virtually by using the estimated pair data as the pair data in the process of this time is referred to as "extrapolation".

The target information deriving unit 73 determines that pair data which cannot be determined to have the continuity with the pair data processed in the past out of the pair data in the process of this time as new pair data derived for the first time, that is, a new target.

The target information deriving unit 73 then determines whether or not the temporal continuity between the pair data acquired in the process of this time and the pair data acquired in the process in the past continues by a predetermined number of times or more (Step S15). In the case where the continuity is continued by the predetermined number of times or more (Yes in Step S15), the target information deriving unit 73 performs a filtering process for outputting the target information to the vehicle control apparatus 2 (Step S16). The predetermined number of times can be set as needed and, for example, three times is also applicable.

The case where the continuity is continued three times means the case where pair data P1 is derived for the first time in the process of the last time but one, for example, then pair data having the same target as the target corresponding to the pair data P1 is derived in the process of the last time, and pair data having the same target as the target corresponding to the pair data P1 is also derived in this process. In the case where the continuity is not continued by the predetermined number of times in Step S15 (No in Step S15), the number of times of the continuity is determined by the target information acquiring process from the next time onward (hereinafter, referred to as "process from the next time onward") after the termination of the process of this time.

In this manner, the data processing section 7 determines whether or not the pair data of the same target are derived continuously in a plurality of times of the target information acquiring process so as to prevent an output of the erroneous pair data to the vehicle control apparatus 2. In the case where the pair data in the process in the past is the erroneous pair data, the pair data of the process of this time having a value relating to the target information close to the estimated pair data estimated from the erroneous pair data is not derived. Consequently, the extrapolating process is performed in the process of this time, and the extrapolating process continues in the process from the next time onward, and then the erroneous pair data is deleted from the memory 63.

Subsequently, the target information deriving unit 73 performs the filtering process on the pair data having the continuity of a predetermined number of times or more and smoothens the target information of the pair data in the direction of the time axis (Step S16). Specifically, the target information deriving unit 73 derives weighted average data of the target information of the pair data as an instantaneous value derived in the process of this time and the target information of the estimated pair data used in the continuity determination process (hereinafter referred to as "filter data") as new target information of the pair data. For example, the target information deriving unit 73 lets 0.25 stand for a weight of the target information of the pair data derived in the process of this time, and 0.75 stand for a weight of the target information of the estimated pair data. The target information of the pair data as the instantaneous value may become an abnormal value due to the influence of noise or the like. However, becoming the abnormal value may be prevented by performing the filtering process.

Subsequently, the target information deriving unit 73 performs a moving object determining process, and sets a moving object flag and a preceding vehicle flag on the filter data (Step S17). The target information deriving unit 73 derives first an absolute speed and a traveling direction of the target of the vehicle indicated by the filter data on the basis of the relative speed of the filter data and the speed of the vehicle obtained from the vehicle speed sensor 81.

In the case where the absolute speed of the target indicated by the filter data is a predetermined speed (for example, 1 km/h) or higher, the target information deriving unit 73 determines that the target is a moving object and turns the moving object flag to ON, and in the case where the absolute speed of the target indicated by the filter data is lower than the predetermined speed (for example, 1 km/h), the target information deriving unit 73 determines that the target is a standstill object, and turns the moving object flag to OFF. In other words, the moving object determining process can be said to be a standstill object determining process for determining whether or not the object is a standstill object.

The target information deriving unit 73 turns the preceding vehicle flag ON if the traveling direction of the target indicated by the filter data is the same direction as the vehicle and the absolute speed is a predetermined speed (for example, 18 km/h) or higher, and turns the preceding vehicle flag OFF if the target indicated by the filter data does not satisfy these conditions.

The target information deriving unit 73 also performs an upper object determining process as well. Specifically, in the case where an extrapolation frequency of the target indicated by the filter data is a predetermined frequency (for example, 5 times in eight times of scanning) or higher, and a received signal level is lower than the threshold value, the target information deriving unit 73 determines that the target is an upper object overhead of the hos vehicle and with which the host vehicle cannot collide. The upper object is liable to go out of a transmitting range as it gets closer to the vehicle unlike the preceding vehicle positioned on the road, the extrapolation frequency is increased and, in addition, the level of the received signal is also smaller than the preceding vehicle. Therefore, if the conditions as described above are satisfied, the target can be determined to the upper object. If the target is determined to be the upper object, an upper object flag is turned ON. After the upper object flag has turned ON, if the received signal is increased to the threshold value or higher, the target is determined not to be the upper object and, hence the upper object flag is turned OFF.

Subsequently, the environment determining unit 74 performs an environment determining process for determining the environment in which the vehicle travels (Step S18). The environment determining process is a process for determining whether or not an environment in which the vehicle travels is a so-called adverse environment, in which erroneous pairing may easily occur. Examples of an environment in which the erroneous pairing may occur include the road having a number of standstill objects, for example, and in particular, the road having a number of upper objects such as the truss bridges and tunnels. In this embodiment, an "environment determining flag" is provided as the flag indicating that the environment is an adverse environment, and when it is determined to be the adverse environment, the environment determining flag is turned ON. Detailed description about the environment determining process will be given later.

Subsequently, the target information deriving unit 73 selects a predetermined number (for example, 20) of filter data which become historical objects for the processes of next time onward from among all of the pair data (Step S19). The historical object here is a process of selecting filter data corresponding to a target traveling in the same traveling lane as the vehicle and close to the vehicle on the priority basis while considering the fore-and-aft distance and the lateral distance of the filter data of the process of this time. In other words, it is a process for selecting filter data having the moving object flag ON and the preceding vehicle flag ON on the priority basis. The target information deriving unit 73 figures out the shape of the traveling lane on the basis of a steering angle of the vehicle obtained from the steering sensor 82, and determines whether or not the target travels in the same traveling lane as the vehicle. The process of the peak extraction for deriving the pair data temporally continuing from the process of the next time onward is performed for the filter data which have become the historical objects on the priority basis over other filter data.

Subsequently, the target information deriving unit 73 performs a coupling process (grouping), and couples the filter data relating to the same object among all the filter data into one (Step S20). For example, in the case where the transmitting wave TW is reflected from a vehicle traveling in front of the vehicle, the transmitting wave TW normally reflects at a plurality of reflecting points of the vehicle. Therefore, the reflected wave RW reaches the radar apparatus 1 respectively from the plurality of the reflecting points of the same vehicle, and hence the filter data relating to each of the plurality of reflecting points is derived. The target indicated by the plurality of pieces of filter data as described above is the same vehicle, so that the target information deriving unit 73 couples these pieces of filter data into one. For example, the target information deriving unit 73 couples the plurality of pieces of filter data in which the relative speed is substantially the same and the fore-and-aft distance and the lateral distance are close to each other into one. The target information of the filter data after the coupling may employ an average value of the target information of the plurality of pieces of filter data, which have been objects of coupling, for example.

Subsequently, the target information output unit 75 outputs the target information (the fore-and-aft distance, the relative speed, and the lateral distance) of the derived filter data and the result of determination in the environment determining process (the environment determining flag) to the vehicle control apparatus 2 (Step S21). The target information output unit 75 selects filter data indicating a target traveling in the same traveling lane as the vehicle and close to the vehicle on the priority basis while considering the fore-and-aft distance and the lateral distance of the filter data.

The vehicle control apparatus 2 performs adequate vehicle control on the basis of the acquired target information. This control is performed while considering the acquired environment determining flag. In other words, if the environment in which the vehicle travels is not an adverse environment, the normal vehicle control is performed. In contrast, if the environment is an adverse environment, control considering that the environment is an adverse environment such as not performing the vehicle control, or lowering the degree of control is executed.

5. Environment Determining Process

Subsequently, the environment determining process to be performed by the environment determining unit 74 (Step S18 in FIG. 5) will be described. In this embodiment, three types of processes are executed as the process for determining a traveling environment of the vehicle. Three types of the processes will be described in detail and each of the processes is referred to as a first environment determining process, a second environment determining process, and a third environment determining process, respectively.

In the first to the third environment determining processes, parameters such as a first environment determining flag, a second environment determining flag, and a third environment determining flag are used, respectively. These flags are flags respectively indicating the result of determination whether or not the environment is an adverse environment, and if it is determined as the adverse environment, these flags are turned ON.

The environment determining process is a process for turning the environment determining flag ON in the case where the environment is determined to be an adverse environment in any one of these three processes. In other words, the environment determining unit 74 turns the environment determining flag ON when at least one of the conditions from (a1) to (a3) given below is satisfied.

(a1) The first environment determining flag is ON.
(a2) The second environment determining flag is ON.
(a3) The third environment determining flag is ON.

The respective environment determining processes will be described specifically below.

5-1. First Environment Determining Process

First of all, the first environment determining process will be described. The first environment determining process is a process for determining whether or not the environment is an adverse environment in accordance with the number of the standstill objects present within a predetermined range from the vehicle. Specifically, when the vehicle is traveling in a tunnel, for example, an erroneous pairing may occur easily due to the influence of reflection from side walls or a ceiling, and hence there is a probability of performing erroneous vehicle control. Therefore, the first environment determining process is a process of determining the environment as an adverse environment when a number of standstill objects such as the side walls are detected. In the case where the environment is determined to be an adverse environment by the first environment determining process, the first environment determining flag is turned ON.

Figure 6:
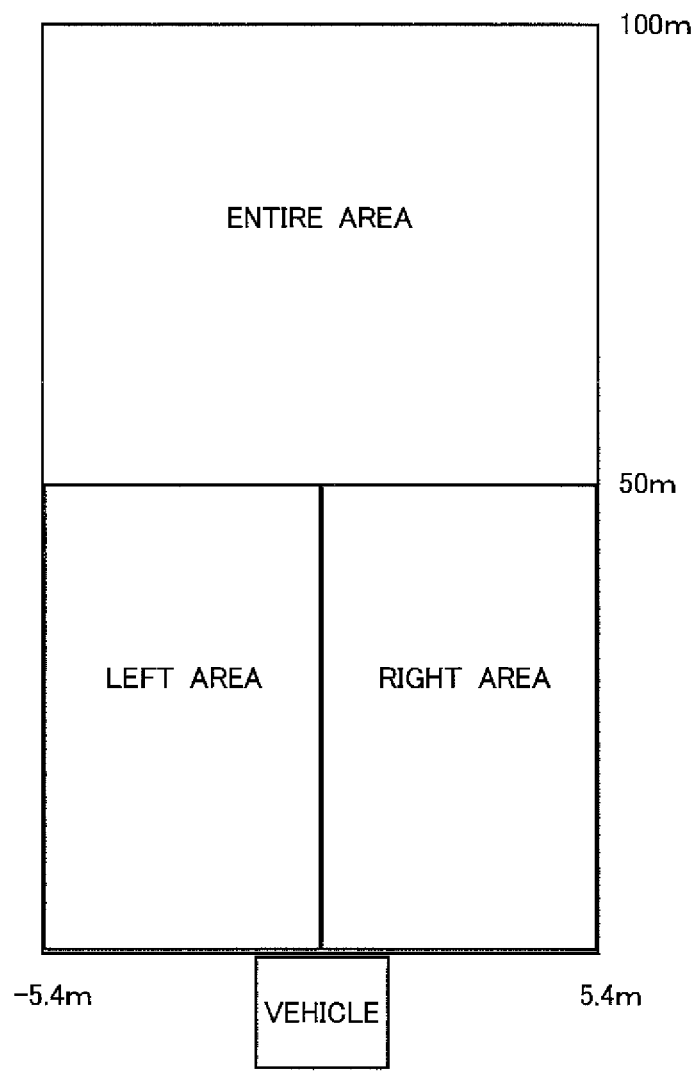
FIG. 6 is a drawing illustrating a determination area configured to execute a first environment determining process.

FIG. 6 is a drawing illustrating a determination area configured to execute the first environment determining process. As illustrated in FIG. 6, in the first environment determining process, an area of 5.4 m on the left and the right and 100 m in the front of the vehicle (hereinafter, referred to as "entire area") is set to a determination area. In particular, an area of 5.4 m on the right side and 50 m in the front of the vehicle (hereinafter, referred to as "right area") and an area of 5.4 m on the left side and 50 m in the front of the vehicle (hereinafter, referred to as "left area") are set to areas for determining while focusing on the standstill objects present on the left and right of the vicinity of the vehicle.

In the first environment determining process, a parameter "standstill object peak number LARGE flag" is used. The "standstill object peak number LARGE flag" is a flag indicating whether or not a number of peak signals relating to the standstill objects are present. In other words, it can also be said to be a flag indicating whether or not a number of targets of the standstill objects are present. The standstill object peak number LARGE flag is turned ON when all of the conditions (b1) to (b3) given below are satisfied.
(b1) The standstill object peak number LARGE flag is OFF.
(b2) The number of the standstill object peaks is 100 or more.
(b3) The number of the entire area pair standstill objects is 17 or more.

The "number of standstill object peaks" corresponds to the total number of the peak signals extracted as the standstill object. Specifically, all of the peak signals in the UP periods among the pair data of the standstill objects derived by pairing the peak signals in the UP periods and the peak signals in the DOWN periods are counted. Then, the value of the moving average of the counted values obtained by preceding 5 times of scanning including the process of this time corresponds to the standstill object peak number.

The "number of the entire area pair standstill objects" corresponds to the number of pair data present in the entire area from among those derived as the pair data of the standstill objects which have become the pair data of the standstill objects as the historical objects or the pair data of the newly detected standstill objects. Specifically, the number of the pair data of the standstill objects in the entire area is derived by filtering the number of the pair data of the standstill objects present in the entire area derived in the process of this time (value of this time) and the number of pair data of the standstill objects present in the entire area derived in the process of the previous time (value of previous time). For example, the expression, Entire area pair standstill object=Value of Previous Time×0.9+Value of This time×0.1 may be used for derivation.

In contrast, the standstill object peak number LARGE flag is turned OFF when all of the conditions (c1) to (c3) given below are satisfied.
(c1) The standstill object peak number LARGE flag is ON.
(c2) The number of standstill object peaks is smaller than 60.
(c3) The number of the entire area pair standstill object is smaller than 10.

In other words, in the case where a large number of the targets of the standstill objects are present in the periphery of the vehicle, the standstill object peak number LARGE flag is a flag to be turned ON in the case where a constant number or more of the standstill objects are present within the determination area which specifically affects on the travel of the vehicle, and to be turned OFF if no more than a constant number of standstill objects are present within the determination area. In the case where any one of the above-described (b1) to (b3) is not satisfied, or in the case where any one of (c1) to (c3) is not satisfied, the standstill object peak number LARGE flag holds the value of the previous time.

The first environment determining process is performed by using the standstill object peak number LARGE flag in which ON or OFF is set in this manner.

Specifically, the environment determining unit 74 determines whether or not all of the conditions (d1) to (d3) given below are satisfied.
(d1) The vehicle speed is 15 km/h or higher.
(d2) The standstill object peak number LARGE flag is ON.
(d3) The number of the left area pair standstill object is 8 or more or the number of the right area pair standstill object is 8 or more.

The vehicle speed is derived on the basis of the data input from the vehicle speed sensor 81. The "number of the left area pair standstill objects" corresponds to the number of pair data present in the left area from among those derived as the pair data of the standstill objects which have become the historical objects or the pair data of the newly detected standstill objects. In the same manner, the "number of the right area pair standstill objects" corresponds to the number of pair data present in the right area from among those derived as the pair data of the standstill objects which have become the historical objects or the pair data of the newly detected standstill objects.

In the case where all of the conditions (d1) to (d3) described above are satisfied, the environment determining unit 74 determines an adverse environment and turns the first environment determining flag to ON.

5-2. Second Environment Determining Process

Subsequently, the second environment determining process will be described. The second environment determining process determines whether or not the environment is an adverse environment based on the frequency of detection of the upper object. Specifically, in the case of traveling on the truss bridge, for example, the standstill objects are not detected as many as being determined to be the adverse environment in the first environment determining process. However, there is a probability of erroneous vehicle control because the upper objects are frequently detected. Therefore, the second environment determining process is a process of determining the environment to be an adverse environment when the upper objects are detected frequently. In the second environment determining process as well, in the case where the environment is determined to be an adverse environment, the second environment determining flag is turned ON.

Figure 7:
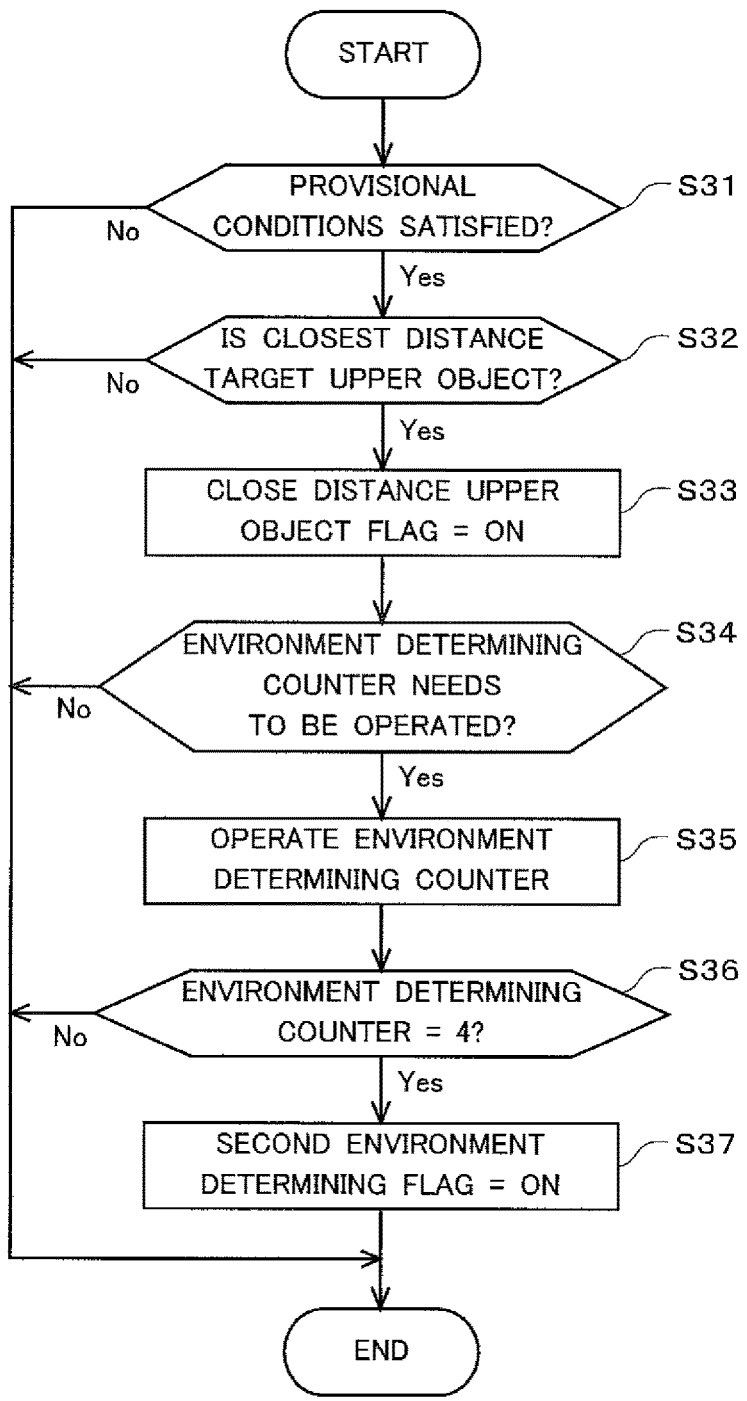
FIG. 7 is a drawing illustrating a flow of a second environment determining process.

FIG. 7 is a flowchart illustrating the second environment determining process. As illustrated in FIG. 7, first of all, the environment determining unit 74 determines whether or not the conditions of (f1) and (f2) given below are satisfied as preconditions (Step S31).
(f1) The number of the standstill object peaks is 40 or more.
(f2) The vehicle speed is 30 km/h or higher.

The "number of the standstill object peaks" is a total number of the peak signals extracted as the standstill objects, and may be derived in the same manner as described above. The vehicle speed is also derived on the basis of data input from the vehicle speed sensor 81. In other words, (f1) and (f2) are on the basis of the conditions that a certain number or more of the standstill objects are present in the periphery of the vehicle, and that the vehicle is traveling.

In the case where the environment determining unit 74 determines that the preconditions are not satisfied (No in Step S31), the environment determining unit 74 terminates the second environment determining process. In contrast, in the case where the environment determining unit 74 determines that the preconditions are satisfied (Yes in Step S31), the environment determining unit 74 determines whether or not a standstill closest distance target is the upper object (Step S32). Specifically, the environment determining unit 74 derives the standstill closest distance target.

The standstill closest distance target means the target present at a distance closest to the vehicle among the targets determined as the standstill objects. In this embodiment, the target that satisfies all of the conditions from (g1) to (g4) given below and are present at a distance closest to the vehicle is determined to be the standstill closest distance target.
(g1) The preceding vehicle flag is OFF.
(g2) The moving object flag is OFF.
(g3) An absolute value of the relative lateral distance is 1.3 m or smaller.
(g4) Determined as an upper object but is not the closest distance target.

The conditions (g1) and (g2) require that the target object is a standstill object. The condition (g3) requires that the target is included in the lane where mainly the vehicle travels. The condition (g4) requires that the target has never determined as the closest distance target. In other words, the condition (g4) excludes the target which has been a closest distance target once.

The environment determining unit 74 then determines whether or not the closest distance target among the derived standstill objects is an upper object. Specifically, in the case where the upper object flag of the closest distance target among the derived standstill objects is ON, the environment determining unit 74 determines that the standstill closest distance target is the upper object.

In the case where the standstill closest distance target is the upper object (Yes in Step S32), the environment determining unit 74 turns a close distance upper object flag ON (Step S33). The close distance upper object flag is a flag turned ON when the standstill closest distance target is an upper object. If the standstill closest distance target is not the upper object (No in Step S32), the close distance upper object flag is set to OFF and the second environment determining process is terminated.

Figure 8A:
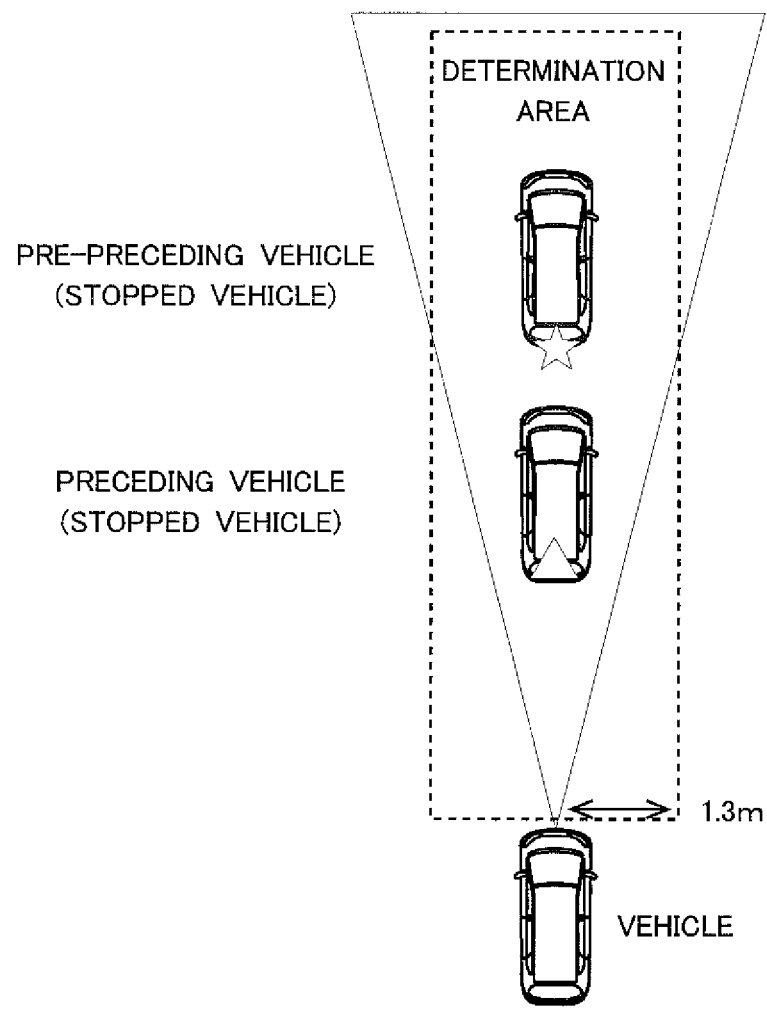
FIG. 8A is a drawing for explaining a reason when a closest distance target is derived.
Figure 8B:
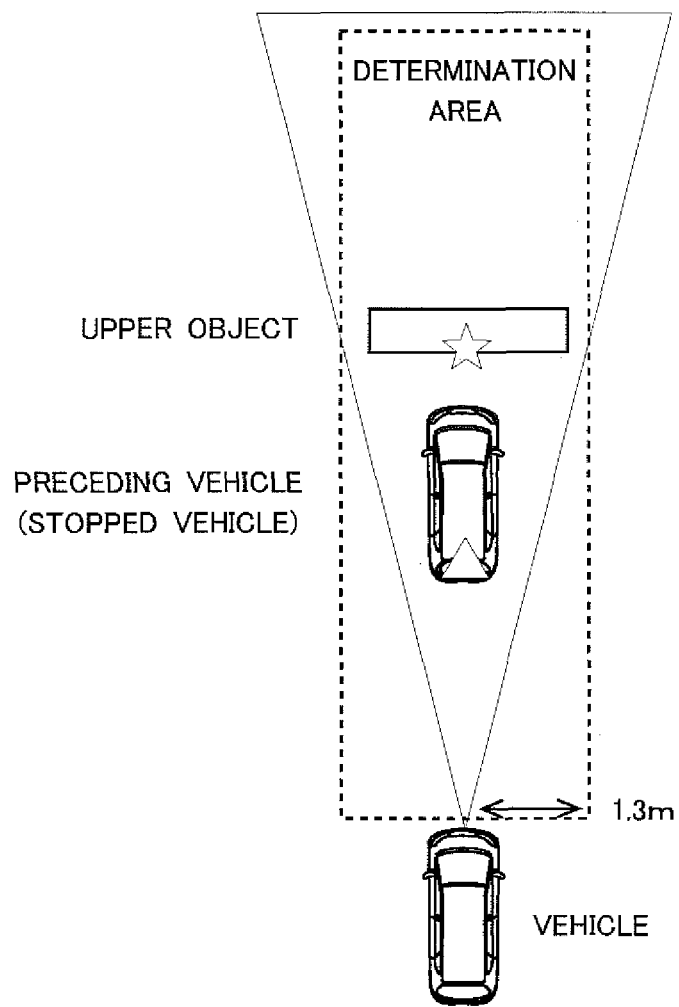
FIG. 8B is a drawing for explaining a reason when the closest distance target is derived.

The reason why the standstill closest distance target is derived in the second environment determining process will be described with reference to FIG. 8A and FIG. 8B. FIG. 8A and FIG. 8B are drawings for explaining the reason why the closest distance target is derived. FIG. 8A illustrates a case where a preceding vehicle stopping in front of the vehicle, and a pre-preceding vehicle stopping in front of the preceding vehicle are present. FIG. 8B illustrates a case where a preceding vehicle stopping in front of the vehicle is present, and a standstill object (upper object) is present in front and above the preceding vehicle.

In the case illustrated in FIG. 8A, a reflected wave having a certain intensity may be received from the preceding vehicle, and hence the preceding vehicle can be derived as a standstill object, but not an upper object. However, in many cases, the intensity of the reflected wave from the pre-preceding vehicle is weak and hence the reflected wave cannot be received sufficiently and stably. Therefore, the case where the pair data corresponding to the pre-preceding vehicle cannot be derived and hence the extrapolation is performed increases, and the pre-preceding vehicle may be derived as the upper standstill object. In this case, the state is erroneously determined to be the state as illustrated in FIG. 8B.

In the case where the frequency of determining the upper object is high, the second environment determining process determines that the environment is determined to be an adverse environment, so that the accurate environment determining process cannot be performed. Therefore, in this embodiment, only the standstill closest distance target is aimed, and the standstill objects present farther therefrom are not considered.

Returning back to FIG. 7, the environment determining unit 74 then determines whether or not an environment determining counter is operated or not (Step S34). The environment determining counter means a counter which indicates the degree of the adverse environment in the environment where the vehicle travels, and if the closest distance target derived (determined to exist) from a range of a predetermined distance by which the vehicle travels is determined to be an upper object, the value varies by a certain value. A value of a variable is for example "+1" and, in this case, if the closest distance target is determined to be an upper object and then the next closest distance target is detected within the predetermined distance, the environment determining counter is incremented by one.

In the case where the closest distance target is determined to be an upper object, and then the next closest upper object (in this case, the next closest upper object becomes the closest distance target) is not derived within a predetermined distance (for example, 50 m), the value of the environment determining counter becomes an initial value. The initial value is, for example, "0". In addition, if the value of the environment determining counter reaches a predetermined value, the environment is determined to be an adverse environment. The predetermined value is, for example, "4". In other words, the minimum value of the environment determining counter is, for example, "0", and the maximum value is, for example, "4". When the value of the environment determining counter reaches the maximum value to 4, the second environment determining flag is turned ON. In other words, if such an event that the closest distance target is determined as the upper object and then the next upper object is detected during the travel for the predetermined distance is continued by a plurality of times, the environment is determined to be an adverse environment, and the second environment determining flag is turned ON.

In Step S34, the environment determining unit 74 determines whether or not the conditions (h1) and (h2) given below are satisfied.
(h1) The close distance upper object flag (this time) is ON.
(h2) The close distance upper object flag (previous time) is OFF or newly detected (this time).

In other words, in the case where the closest distance target of the upper object derived in the process of this time is not determined as the upper closest distance target in the process of the previous time or is detected anew, the conditions are satisfied.

In the case where the environment determining unit 74 determines that the conditions (h1) and (h2) are satisfied (Yes in Step S34), the environment determining unit 74 operates the environment determining counter (Step S35). In this embodiment, the value of the environment determining counter is operated to increment one. In other words, when the value of the environment determining counter of the previous time is "0", the counted value is incremented to "1", and when it is "3", the counted value is incremented to "4". However, when a provisional environment determining flag described later is ON, the value of the environment determining counter is set to "4". In contrast, in the case where the environment determining unit 74 determines that the conditions (h1) and (h2) are not satisfied (No, in Step S34), the environment counter is not operated, and the second environment determining process is terminated.

The environment determining unit 74 determines whether or not the condition
(i1) given below is satisfied (Step S36).
(i1) The environment determining counter is 4.

In the case where the environment determining counter is 4 (Yes in Step S36), the environment determining unit 74 turns the second environment determining flag ON (Step S37). In contrast, in the case where the environment determining counter is not 4 (No, in Step S36), that is, in the case where the environment determining counter is smaller than 4, the environment determining unit 74 does not change the environment determining flag (hold the value of the previous time) and terminates the second environment determining process.

In the second environment determining process, if any of the conditions (j1) to (j3) given below is satisfied, the environment determining unit 74 turns the environment determining counter to 0.
(j1) The traveling distance from a moment when the closest distance target is determined as the upper object is 50 m or more.
(j2) The vehicle speed is lower than 30 km/h.
(j3) the number of the standstill object peaks is smaller than 20.

In other words, in the case where the environment is estimated not to be an adverse environment, such as a case the upper object is not detected from the last detection of the upper object until the vehicle travels by a certain distance, the case where the vehicle is not traveling, or the case where not many standstill objects are present in the periphery of the vehicle, the environment determining counter becomes 0.

In the second environment determining process, if the condition (k1) given below is satisfied, the second environment determining flag is turned OFF.
(k1) The environment determining counter is 0.

In other words, when the environment is estimated not to be an adverse environment, the environment determining flag which indicates that the environment is an adverse environment is kept OFF.

In this manner, in the second environment determining process, since the second environment determining flag is turned OFF when the environment determining counter becomes 0, the environment determining counter needs to be 4 in order to cause the second environment determining flag to be turned ON again. In other words, an operation to increment the value of the environment determining counter by one needs to be performed four times.

However, in the case of the truss bridge, there is a case where the upper objects are present only at a certain distance and, in such a case, there is also a case where a period which is not determined as an adverse environment only by chance is present, and the environment returns back to the adverse environment soon. In such a case, the operation to increment the value of the environment determining counter by one is performed four times and then the environment is determined to be an adverse environment. Therefore, there arises a time lag.

Therefore, in the second environment determining process, in the case where the second environment determining flag is changed from ON to OFF, the second environment determining flag can be turned ON immediately while a certain period. Specifically, in the second environment determining process, a parameter referred to as "provisional environment determining flag" is used. The provisional environment determining flag as described above is a parameter which allows the second environment determining flag to be turned ON easily. The provisional environment determining flag is turned ON when all of the conditions (k1) to (k2) given below are satisfied.
(k1) The second environment determining flag (this time) is OFF.
(k2) The second environment determining flag (previous time) is ON.

In other words, when the second environment determining flag is switched from ON to OFF, the provisional environment determining flag is turned ON.

In contrast, the provisional environment determining flag is turned OFF when the condition (l1) given below is satisfied.
(l1) A distance that the vehicle travels in a state in which the environment determining counter is maintained at 0 after the second environment determining flag (this time) is turned OFF is 50 m or longer.

In other words, in the case where a state in which the upper object is not detected continues for an additional certain distance after the detection of the upper object is ended while the vehicle travels a certain distance, the environment may be determined not to be an adverse environment, so that the provisional environment determining flag is turned OFF.

When the provisional environment determining flag is ON, a special operation of the environment determining counter is also performed. Specifically, the environment determining counter is set to "4" if all of the conditions (m1) to (m2) given below are satisfied.
(m1) The provisional environment determining flag is ON.
(m2) The environment determining counter is one or more.

In other words, in the case where the upper object is detected in a state in which the provisional environment determining flag is ON, the value of the environment determining counter becomes 4 immediately, and the second environment determining flag is turned ON. In other words, the second environment determining flag can be turned ON in one operation without performing the operation to increment the value of the environment determining counter by one four times.

Figure 9:
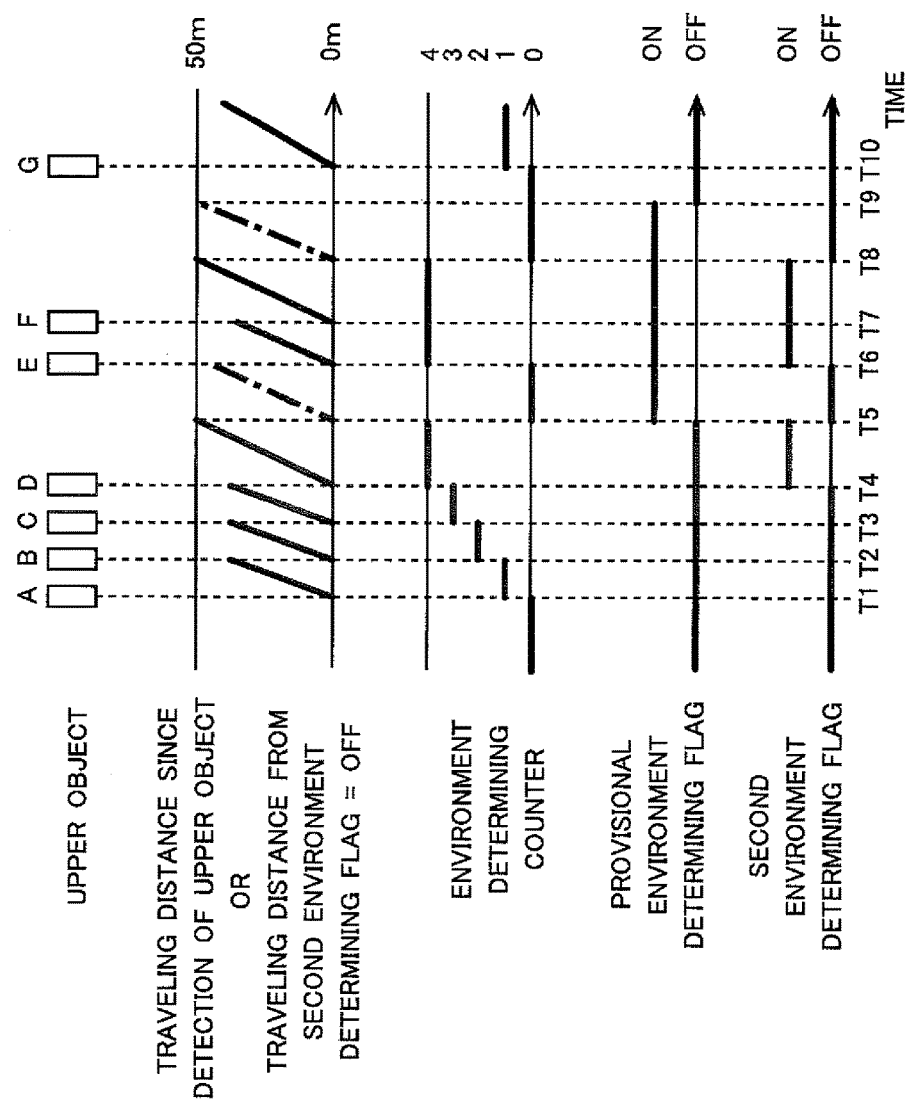
FIG. 9 is a drawing illustrating a variation in respective flags and environment determining counters.

Here, a flow of the second environment determining process will be described with reference to the drawing. FIG. 9 is a time chart illustrating changes of the second environment determining flag and the environment determining counter when the vehicle is traveling.

In FIG. 9, a solid line out of lines indicating the distance of travel indicates a traveling distance after an upper object is detected, and an alternate chain line indicates a traveling distance after the second environment determining flag is changed from ON to OFF. FIG. 9 illustrates a range of the traveling distance from 0 m to 50 m. The environment determining counter indicates values from 0 to 4 step by step. The provisional environment determining flag and the second environment determining flag indicate ON and OFF, respectively.

As illustrated in FIG. 9, an upper object A as a closest distance target is detected at time T1 from a state where the vehicle is traveling in an environment in which the upper object is not detected. When the upper object A as the closest distance target is detected, the environment determining counter is incremented by one. In this case, although the environment determining counter is changed from 0 to 1, the second environment determining flag stays OFF.

If an upper object B as the next closest distance target is detected during a period from time T1 at which the upper object A is detected to time T2 at which the vehicle has traveled 50 m (the upper object A is not the closest distance target any longer at this moment, and hence the upper object B is the upper object as the closest distance target), the environment determining counter is incremented by one. In this case as well, although the environment determining counter is changed from 1 to 2, the second environment determining flag stays OFF.

In addition, if an upper object C as the subsequent closest distance target is detected during a period from time T2 at which the upper object B is detected to time T3 at which the vehicle has traveled 50 m (in the same manner, the upper object C is the upper object as the closest distance target), the environment determining counter is incremented by one. In this case as well, although the environment determining counter is changed from 2 to 3, the second environment determining flag stays OFF.

If an upper object D as the subsequent closest distance target is detected during a period from time T3 at which the upper object C is detected to time T4 at which the vehicle has traveled 50 m (in the same manner, the upper object D is the upper object as the closest distance target), the environment determining counter is incremented by one. In the case, the environment determining counter is changed from 3 to 4, the environment is determined to be an adverse environment and the second environment determining flag is turned ON.

Then, when the vehicle travels 50 m from the time T4 at which the upper object D has detected in a state in which the upper object as the closest distance target is not detected, the environment determining counter becomes "0" at that timing (time T5). When the environment determining counter becomes "0", the second environment determining flag is turned OFF. Since the second environment determining flag is changed from ON to OFF, the provisional environment determining flag is turned ON.

Then, if an upper object E as the closest distance target is detected during a period from time T5 at which the second environment determining flag is changed from ON to OFF to time T6 at which the vehicle has traveled 50 m (in the same manner, in this case, the upper object E is an upper object as the closest distance target), an operation to increment the environment determining counter by one is normally performed. However, since the provisional environment determining flag is ON, the environment determining counter becomes "4". In the case, the environment determining counter is 4, the environment is determined to be an adverse environment and the second environment determining flag is turned ON.

If an upper object F as the closest distance target is detected during a period from time T6 at which the upper object E has detected to time T7 at which the vehicle has traveled 50 m (in the same manner, the upper object F is an upper object as the closest distance target), the environment determining counter holds the value "4", and both of the second environment determining flag and the provisional environment determining flag are held to be ON.

When the vehicle travels 50 m from the time T7 at which the upper object F has detected in a state in which the upper object as the closest distance target is not detected, the environment determining counter becomes "0" at that timing (time T8), and the second environment determining flag is turned OFF. However, in this case as well, the provisional environment determining flag is held to be ON. It is because the conditions to turn the provisional environment determining flag OFF are not satisfied.

Then, when the vehicle travels 50 m from the time T8 at which the environment determining counter is turned to 0 and the second environment determining flag is changed from ON to OFF in a state in which the upper object as the closest distance target is not detected, the provisional environment determining flag is turned OFF at that timing (time T9). Then, when an upper object G of the closest distance target is detected during the vehicle traveling, the same process is repeated.

5-3. Third Environment Determining Process

Subsequently, the third environment determining process will be described. The third environment determining process determines whether or not the environment is an adverse environment based on the number of standstill objects and the frequency of detection of the upper object. Specifically, the third environment determining process is a process which determines the environment to be an adverse environment even in the case where the vehicle travels on a bridge and upper objects at both ends of the bridge are detected but the upper objects in a center portion are not detected.

In the second environment determining process, even though the second environment determining flag is turned from ON to OFF, if an upper object is detected within the predetermined distance, the second environment determining flag is turned ON immediately and the environment is indicated to be an adverse environment. However, in the case where the vehicle travels on the bridge where an upper object is not detected in the center portion, there arises a case where the upper object is not detected within the predetermined distance after the second environment determining flag is turned from ON to OFF even though the environment is an adverse environment. In this condition, the provisional environment determining flag is also turned OFF, and hence it takes time until the environment is determined to be an adverse environment for the next time. The third environment determining process solves this problem, and is configured to be capable of determining the environment to be an adverse environment immediately on the basis of the number of standstill objects after the second environment determining flag is turned from ON to OFF. In the third environment determining process as well, in the case where the environment is determined to be an adverse environment, the third environment determining flag is turned ON.

A determination area in which the third environment determining process is executed is the same as the determination area illustrated in FIG. 6. In other words, in the third environment determining process as well, an area of 5.4 m on the left and the right and 100 m in the front of the vehicle (entire area) is set to a determination area. In particular, an area of 5.4 m on the right side and 50 m in the front of the vehicle (right area) and an area of 5.4 m on the left side and 50 m in the front of the vehicle (left area) are set to areas for determining while focusing on standstill objects present on the left and right of the vicinity of the vehicle.

In the third environment determining process, the environment determining unit 74 determines whether or not all of the conditions (n1) to (n4) given below are satisfied.

(n1) The provisional environment determining flag is ON.
(n2) The number of the standstill object peaks is 60 or more.
(n3) The number of the entire area pair standstill objects is 15 or more.
(n4) The number of the left area pair standstill objects is 10 or more or the number of the right area pair standstill objects is 10 or more.

The "provisional environment determining flag" is a flog set in the second environment determining process. The number of the standstill object peaks is a total number of the peak signals extracted as the standstill objects, and may be derived in the same manner as described above.

The "number of the entire area pair standstill objects" corresponds to the number of pair data present in the entire area from among those derived as the pair data of the standstill objects which have become the historical objects or the pair data of the newly detected standstill objects. Specifically, the number of the entire area pair standstill objects is derived by filtering the number of the pair data of the standstill objects present in the entire area derived in the process of this time (value of this time) and the number of pair data of the standstill objects present in the entire area derived in the process of the previous time (value of previous time). For example, in the same manner as described above, the expression, Entire area pair standstill object=Value of Previous Time×0.9+Value of This time×0.1 may be used for derivation.

The "number of the left area pair standstill objects" corresponds to the number of pair data present in the left area from among those derived as the pair data of the standstill objects which have become the historical objects or the pair data of the newly detected standstill objects. The "left area pair standstill object" in this embodiment is derived by filtering the number of the pair data of the standstill objects present in the left area derived in the process of this time (value of this time on the left) and the number of pair data of the standstill objects present in the left area derived in the process of the previous time (value of previous time on the left). For example, the expression, Left area pair standstill object=Value of Previous Time on the Left×0.8+Value of This time on the Left×0.2 may be used for derivation.

In the same manner, the "number of the right area pair standstill objects" corresponds to the number of pair data present in the right area from among those derived as the pair data of the standstill objects which have become the historical objects or the pair data of the newly detected standstill objects. The "right area pair standstill object" in this embodiment is derived by filtering the number of the pair data of the standstill objects present in the right area derived in the process of this time (value of this time on the right) and the number of pair data of the standstill objects present in the right area derived in the process of the previous time (value of previous time on the right). For example, the expression, Right area pair standstill object=Value of Previous Time on the Right×0.8+Value of This time on the Right×0.2 may be used for derivation.

In the case where the environment determining unit 74 determines all of the conditions (n1) to (n4) described above are satisfied, the environment determining unit 74 turns the third environment determining flag ON.

In the third environment determining process, the environment determining unit 74 determines whether all of the conditions (o1) to (o3) given below are satisfied as well.
(o1) The number of the standstill object peaks is 20 or smaller.
(o2) The number of the entire area pair standstill objects is 13 or smaller.
(o3) The vehicle speed is lower than 30 km/h.

In the case where the environment determining unit 74 determines all of the conditions (o1) to (o3) described above are satisfied, the environment determining unit 74 turns the third environment determining flag OFF. The vehicle speed is derived on the basis of data input from the vehicle speed sensor 81.

In this manner, the third environment determining process is a process of determining whether or not the environment is an adverse environment while considering the standstill objects present in the vicinity of the vehicle while the provisional environment determining flag is ON. The number of standstill objects whereby the environment is determined as an adverse environment is smaller than the first environment determining process. In other words, the third environment determining process determines that the environment is an adverse environment under the conditions gentler than those of the first environment determining process even in the case where the upper object is not detected when the environment is determined not to be an adverse environment once by the second environment determining process, and hence is capable of determining the environment as an adverse environment also while traveling on the bridge in which the upper object is not detected only in the center portion.

As described above, according to the embodiment, the adverse environment can be determined in accordance with the number of the standstill objects and the frequency of detection of the upper object. By determining the environment as an adverse environment in combination with these processes, an adequate environment determining process can be executed even in the case where the vehicle is traveling in various adverse environments such as the tunnel and the truss bridge. Consequently, the erroneous pairing may be prevented, and erroneous vehicle control may be avoided.

The invention includes a counter configured to vary the value by a certain value when the upper object is derived within the predetermined distance, and hence whether or not the environment is an adverse environment may be determined based on the frequency of detection of the upper object. The invention is configured to set the value of the counter to an initial value when the upper object is not derived in the predetermined distance, so that the environment can be estimated not to be an adverse environment.

According to the invention, in the case where the environment is determined to be an adverse environment once, even though the environment is determined not to be an adverse environment in the subsequent process, the value of the counter is set to a predetermined value if the upper object is derived within the predetermined distance, so that the environment may be determined as an adverse environment. In other words, the adverse environment may be determined immediately without waiting that the value of the counter varies from the initial value to the predetermined value.

In the description of the embodiments described above, various functions are implemented as software by the arithmetic processing of the CPU in accordance with the program. However, part of the functions may be implemented by an electric hardware circuit. In contrast, part of the functions which have been described as being implemented by the hardware circuit may be implemented by software.

While the invention has been shown and described in detail, the foregoing description is in all aspects illustrative and not restrictive. It is therefore understood that numerous other modifications and variations can be devised without departing from the scope of the invention.

What is claimed is:
1. A radar apparatus configured to derive information of a target in a vicinity of a host vehicle, the radar apparatus comprising:

a transmitting antenna that transmits a transmission wave having a frequency that increases and decreases at a predetermined cycle;
a receiving antenna that receives a reflection wave caused by the transmission wave being reflected by the target;
a target information deriving unit that derives the information of the target by a pairing of a peak signal in an UP period obtained from the reflection wave with a peak signal in a DOWN period obtained from the reflection wave; and
a signal processor configured to:
determine whether or not the target is a standstill object having an absolute speed less than a predetermined speed,
determine whether or not the target determined as the standstill object is an upper object overhead of the host vehicle and with which the host vehicle cannot collide, and
determine, based on a frequency of determining existence of the upper object that also is the standstill object, whether an environment for deriving target information is an adverse environment in which erroneous pairing may occur, or is a non-adverse environment.

2. The radar apparatus according to claim 1, wherein in a case where a particular object is determined to be (1) the standstill object closest to the apparatus and (2) the upper object, the signal processor determines the particular object to be suitable for use in determining whether or not the environment for deriving the target information is the adverse environment.

3. The radar apparatus according to claim 1, wherein the signal processor includes a counter configured to vary a value by a predetermined amount when the upper object is determined to exist within a predetermined distance, and determines that the environment for deriving the target information is the adverse environment when the value of the counter reaches a predetermined value.

4. The radar apparatus according to claim 3, wherein in a case where the upper object is not determined to exist within the predetermined distance, the signal processor sets the value of the counter to an initial value.

5. The radar apparatus according to claim 4, wherein the signal processor sets the value of the counter to the predetermined value when the upper object is determined to exist within the predetermined distance after the value of the counter has been set to the initial value from the predetermined value.

6. The radar apparatus according to claim 4, wherein the signal processor is further configured to determine, based on (i) a number of the peak signals indicative of the standstill object in a predetermined area and (ii) a number of pair data indicative of the standstill object in one of a left area and a right area of the host vehicle, whether the environment for deriving the target information is the adverse environment, in a case where the host vehicle travels the predetermined distance or less after the value of the counter has been set to the initial value, the left area and the right area being portions of the predetermined area.

7. A vehicle control system comprising:
a radar apparatus configured to derive information of a target in a vicinity of a host vehicle, the radar apparatus deriving the information of the target by a pairing of a peak signal in an UP period obtained from a reflection wave received by an antenna of the radar apparatus with a peak signal in a DOWN period obtained from the reflection wave, the radar apparatus including a signal processor configured to:
(a) determine whether or not the target is a standstill object having an absolute speed less than a predetermined speed,
(b) determine whether or not the target determined as the standstill object is an upper object overhead of the host vehicle and with which the host vehicle cannot collide, and
(c) determine, based on a frequency of determining existence of the upper object that also is the standstill object, whether an environment for deriving target information is an adverse environment in which erroneous pairing may occur, or is a non-adverse environment; and
a control apparatus configured to control the host vehicle based on target information on a periphery of the vehicle derived by the radar apparatus, the control apparatus using a first control method when the environment is determined to be the non-adverse environment, and the control apparatus using a second control method having a lower degree of control than the first control method when the environment is determined to be the adverse environment.

8. The vehicle control system according to claim 7, wherein
the signal processor is further configured to determine that the environment for deriving the target information is the adverse environment in a case where (i) a number of the peak signals indicative of the standstill object in a predetermined area is equal to or greater than a first predetermined value, and (ii) a number of pair data indicative of the standstill object in a left area or a right area is equal to or greater than a second predetermined value, the first predetermined value being smaller than a third predetermined value that serves as a threshold for determining whether the environment for deriving the target information is the adverse environment based on (a) the number of the peak signals indicative of the standstill object in the predetermined area and (b) the number of the pair data indicative of the standstill object in the predetermined area.

9. A method of deriving information of a target in a vicinity of a host vehicle with a radar apparatus having (i) a transmitting antenna that transmits a transmission wave having a frequency that increases and decreases at a predetermined cycle, (ii) a receiving antenna that receives a reflection wave caused by the transmission wave being reflected by the target, and (iii) a target information deriving unit that derives the information of the target by a pairing of a peak signal in an UP period obtained from the reflection wave with a peak signal in a DOWN period obtained from the reflection wave, the method comprising:
determining, with a signal processor of the radar apparatus, whether or not the target is a standstill object having an absolute speed less than a predetermined speed;
determining, with the signal processor, whether or not the target determined as the standstill object is an upper object overhead of the host vehicle and with which the host vehicle cannot collide, and
determining, with the signal processor, based on a frequency of determining existence of the upper object that also is the standstill object, whether an environment for deriving target information is an adverse environment in which erroneous pairing may occur, or is a non-adverse environment.

10. The method according to claim 9, wherein
in a case where a particular object is determined to be (1) the standstill object closest to the host vehicle and (2) the upper object, determining, with the signal processor, the particular object to be suitable for use in determining whether or not the environment for deriving the target information is the adverse environment.

11. The method according to claim 9, wherein
the step of determining whether the environment is the adverse environment includes varying a value of a counter by a predetermined amount when the upper object is determined to exist within a predetermined distance, and determining that the environment for deriving the target information is the adverse environment when the value of the counter reaches a predetermined value.

12. The method according to claim 11, wherein
in a case where the upper object is not determined to exist within the predetermined distance, the value of the counter is set to an initial value.

13. The method according to claim 12, wherein
the value of the counter is set to the predetermined value when the upper object is determined to exist within the predetermined distance after the value of the counter has been set to the initial value from the predetermined value.

* * * * *